United States Patent [19]
Auvinen

[11] Patent Number: 5,802,548
[45] Date of Patent: Sep. 1, 1998

[54] SOFTWARE PROGRAMMABLE EDGE DELAY FOR SRAM WRITE ENABLE SIGNALS ON DUAL PURPOSE CACHE CONTROLLERS

[75] Inventor: Stuart T. Auvinen, Santa Cruz, Calif.

[73] Assignee: Chips and Technologies, Inc., San Jose, Calif.

[21] Appl. No.: 272,969

[22] Filed: Jul. 8, 1994

Related U.S. Application Data

[63] Continuation of Ser. No. 782,664, Oct. 25, 1991, abandoned.

[51] Int. Cl.$^6$ .................................................. G06F 13/42
[52] U.S. Cl. ........................... 711/100; 711/154; 711/155
[58] Field of Search ........................... 395/440; 711/100, 711/113, 104, 142–145, 155, 154, 167, 159, 133–137, 109

[56] References Cited

U.S. PATENT DOCUMENTS

| | | | |
|---|---|---|---|
| 3,753,232 | 8/1973 | Sporer | 340/172.5 |
| 4,453,439 | 6/1984 | Koike | 84/653 |
| 4,499,536 | 2/1985 | Gemma et al. | 364/200 |
| 4,712,190 | 12/1987 | Guglielmi et al. | 364/900 |
| 5,014,188 | 5/1991 | Kawamura | 375/425 |
| 5,025,366 | 6/1991 | Baror | 395/425 |
| 5,034,885 | 7/1991 | Matoba et al. | 711/143 |
| 5,043,943 | 8/1991 | Crisp et al. | 365/189.01 |
| 5,175,826 | 12/1992 | Begun et al. | 395/325 |
| 5,201,055 | 4/1993 | Izquierdo et al. | 395/800 |

OTHER PUBLICATIONS

Kummer and Webb, Delayed I/O Read/Write Circuit, May 1984, pp. 6364–6365, IBM Technical Disclosure Bulletin, vol. 26 No. 12.

*Primary Examiner*—Ayaz R. Sheikh
*Assistant Examiner*—Ario Etienne
*Attorney, Agent, or Firm*—Joseph A. Sawyer, Jr.

[57] ABSTRACT

A programmable circuit is used to modify the write enable signal used by static RAMs in cache-based personal computer systems. More specifically, the programmable circuit is used to delay or not delay the trailing edge of the cache write enable (CWE) signals in cache-based personal computer systems thereby enabling the system to accommodate a plurality of microprocessor devices.

10 Claims, 2 Drawing Sheets

SOFTWARE PROGRAMMABLE EDGE DELAY FOR SRAM WRITE ENABLE SIGNALS ON DUAL PURPOSE CACHE CONTROLLERS

This is a continuation of application Ser. No. 07/782,664 filed on Oct. 25, 1991, now abandoned.

FIELD OF THE INVENTION

The present invention relates to a system controller in a personal computer and, more particularly, relates to a system and apparatus for utilizing a single cache controller with different types of microprocessors,

BACKGROUND OF THE INVENTION

Personal computer (PC) systems today are based on Intel's family of IAPx86 microprocessors. Microprocessors termed the 8086, 80286, 80386 and 80486 are part of the APx family. Microprocessors in the IAPx family are commercially available from a number of vendors, including Nippon Electric Corporation (NEC) Advanced Micro Devices Corporation (AMD) and Intel Corporation.

This family is continually evolving, adding performance and integration with each new member. Because of the large existing software base, newer members of the microprocessor family are downward compatible with older devices, and computer manufactures integrate the newer microprocessor devices into computer systems as the devices become available. This integration of technically advanced microprocessors results in computer systems with superior performance and computing capabilities. These increased capabilities can broaden existing markets and open up applications previously untapped.

It is, therefore, important and advantageous to PC manufacturers that they design and demonstrate a system solution using the latest microprocessor in a short time-frame to maximize exposure and gain market-share. Unfortunately, the hardware differences between progressive microprocessor family members usually means that the PC manufacturer must design a complete new system to optimize performance using the newest microprocessor.

The problem is further compounded by the lack and maturity of system supporting chips (chipsets) to support optimum performance using the newest microprocessor family member. This delays the manufacturer's ability to demonstrate an optimized solution, and he will, often times use existing chipsets (designed for a previous family member) with the newest microprocessor to quickly demonstrate a non-optimized solution. The IAPx386 and IAPx486 microprocessors are examples of this progression of a microprocessor family.

These two microprocessors are relatively recent additions to the IAPx86 family. It is generally understood in the industry that the numbers "386" and "486" are applied to microprocessors which have a particular type of architecture. It is also understood that the 386 and 486 architecture adds increasing functionality which is not available in the earlier members of the IAPx family. Many 486 designs will be based on 386 chipsets even though the chipset manufacturer never intended to support 486 designs with an 386 chipset.

Chipsets containing cache controllers for 386 systems have had difficulty in meeting SRAM timings at high speeds. One of the most difficult problems is guaranteeing that the CWE pulse width is sufficient while at the same time maintaining congruency with the fundamental clock (CLK2) period of the system.

For example, in 386 33 megahertz systems, one CLK2 time period is adequate for the CWE pulse width. However, for 40 megahertz 386 systems, the cache write enable CWE signal pulse width needs to be greater than one CLK2 period. An increased CWE pulse width value would afford enough performance margin so that many popular SRAMs could be used in 40 megahertz 386 systems. Fortunately, the 386 processor holds data (for a write cycle) approximately 1 CLK2 period past the end of the DRAM cycle. This generous hold time affords margin to widen the CWE pulse width while still meeting critical SRAN timing parameters.

The 486 microprocessor is not as generous with hold time as the 386 microprocessor. The 486 microprocessor has a minimum data hold time (for write cycles) of 3 nanoseconds (ns) past the end of the DRAM cycle. This disparity of the write data hold timing between the 386 and 486 microprocessors inhibits the use of existing 386 cache controllers optimized for 40 megahertz in a 486 system. One method for solving this problem would be to latch the data for a predetermined time period; however, this would significantly impede the performance of the microprocessor. This solution would slow the data to the extent that the system would no longer function.

The present invention addresses a simple way to modify an existing 386 cache controller to accommodate the small data hold time of the 486 microprocessor. Although this invention has particular application to the IAPx86 family of microprocessors, it should be understood that it can be applied to other processors that have the same above mentioned problem.

SUMMARY OF THE INVENTION

This present invention allows the system software, such as the BIOS, to select the delay of the trailing edge of the cache write enable signal (CWE) generated by a cache controller. The software can program the cache controller to delay the trailing edge of CWE and increase the pulse width to allow 40 megahertz 386 systems to use common (20 ns) cache data SRAMs. Alternately, the software can program the cache controller to not add the delay, thereby meeting the data hold time requirement of the data SRAMs in a 20 megahertz 486 system. This dual functionality enables manufacturers to quickly convert an existing 33 megahertz 386 system to a 40 megahertz 386 system or a 20 megahertz 486 system. This enables the PC manufacturer, using a single system controller, to introduce a multitude of computer systems solutions into the marketplace in a timely fashion with minimum effort. For a microprocessor-based system, containing cache, the system includes a static random access memory (SRAM), the cache controller provides a write enable signal (WE) to the SRAM and a programmable circuit comprising a means for modifying the WE to widen or delay the signal to accommodate a plurality of microprocessor types.

DESCRIPTION OF THE PREFERRED EMBODIMENT

The present invention relates to an improvement in the operation of a cache controller with a microprocessor. The following description is presented to enable one of ordinary skill in the art to make and use the invention, and is provided in the context of a particular application and its requirements. Various modifications to the preferred embodiment will be readily apparent to those skilled in the art, and the generic principles defined herein may be applied to other embodiments. Thus, the present invention is not intended to be limited to the embodiment shown, but is to be accorded the widest scope consistent with the principles and novel features disclosed herein.

Figure 1:
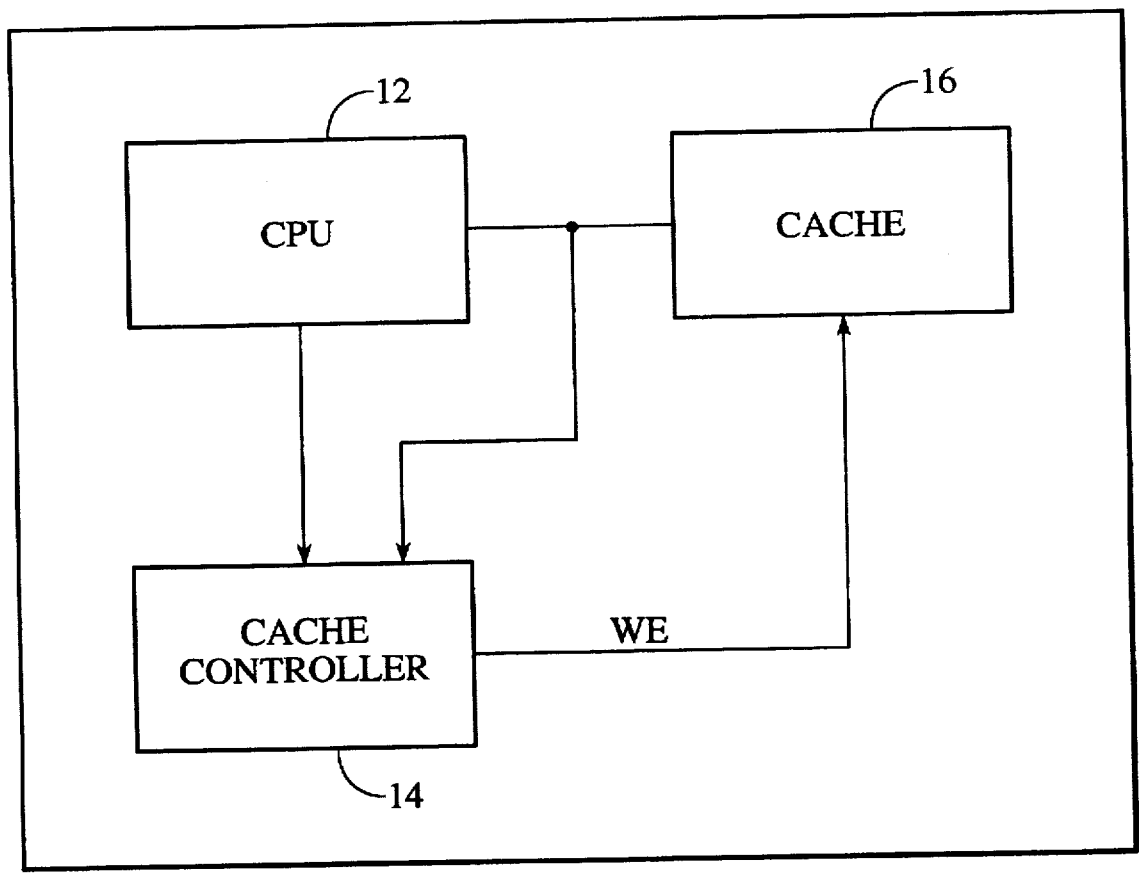
FIG. 1 shows the relevant parts of a prior art personal computer.

Shown in FIG. 1 are the parts of a personal computer 40 that are relevant to the present invention. The PC 40 includes a CPU 42 which interacts with the cache controller 44 and SRAM 46. As is shown, CPU 42 provides 32 bits of data information to the SRAM 46. The cache controller 44 through the provision of address information from CPU 42 retrieves information from the SRAM 46 in the appropriate order. The timing of the SRAM control signals at high speed becomes critical when cache controllers are involved. This becomes especially significant when, as before-described, different CPUs are used, such that the hold times are different. Hence, the present invention provides a system to address SRAM timing considerations.

Figure 2:
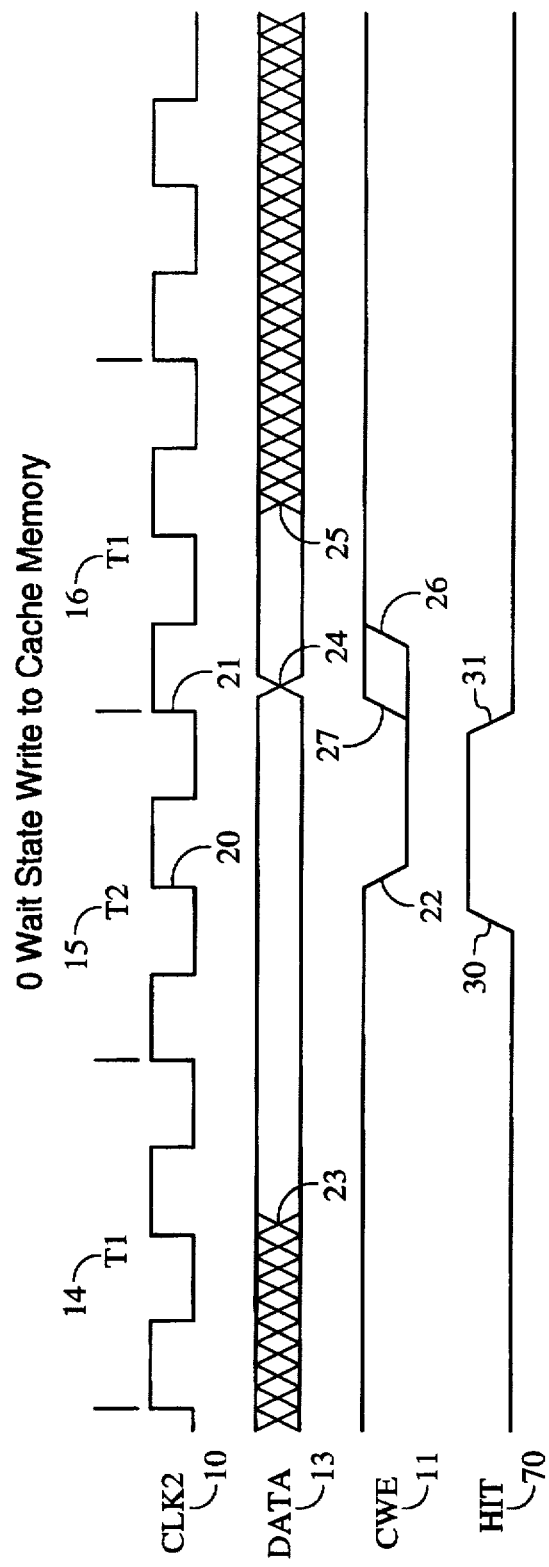
FIG. 2 illustrates the logical waveforms of a 386 or 486 based prior art computer system performing a zero wait state write cycle to cache memory.

Referring now to FIG. 2, there is illustrated several signal waveforms for a high speed (40 megahertz) 386 or low speed (20 megahertz) 486 computer system performing a zero-waitstate write to cache memory. More particularly, the figure illustrates the delayed or non-delayed CWE modes of operation of the preferred embodiment. Included in the illustration are the signal waveforms CLK2 10, DATA 13, CWE 11, HIT 70, T state delineators 14,15,14, and signal edges 20,21,22,24,25,26,27,30,31.

Signal CLK2 10 is the fundamental clock of the computer system. The frequency of CLK2 10 is twice the rated speed of the computer system. For example, A 40 megahertz PC system would have a CLK2 10 frequency of 80 megahertz and a period of 12.5 nanoseconds. Signal DATA 13 is generated by the 386 or 486 microprocessor and shows, by the absence of cross hatching, where data is valid. Signal Hit 70 is an internal cache controller signal that indicates that data is to be cached into cache memory. Signal CWE 11 is generated by the cache controller and is used to indicate to the cache data SRAM memory that a write cycle is taking place. The SRAM will respond to CWE 11 by writing data into the SRAM cache memory.

T state delineators 14, 15, 16 define the bus cycle time of the microprocessor and are two each CLK2 periods of time in length. The write cycle transpires as follows: The microprocessor (386 or 486) starts the cycle indicated by the T1 state 14, typically driving valid data 13 at edge 23. The data for a 386 typically remains active until edge 25. The data for a 486 typically remains active only until edge 24, thereby demonstrating the disparity of data hold times for the two microprocessors during a write cycle.

The cache controller in parallel decodes the cycle address and cycle information (not shown) to determine if the cycle data should be updated into the cache data SRAM memory. Because of the required time to decode the address, the earliest time that the decision can be made will be at CLK2 10 edge 20. If it is determined that the cache memory is to be updated, the CWE 11 signal will go active soon after CLK2 10 edge 20 as indicated by edge 22.

For a 386 microprocessor, the CWE signal remains active past CLK2 10 edge 21 as indicated by edge 26. This enables the CWE 11 pulse width to be sufficiently wide enough for operations at 40 megahertz using common (20 ns) SRAMs. For a 486 microprocessor, signal CWE 11 remains active slightly past CLK2 10 edge 21 as indicated by edge 27. This enables sufficient hold time of data to the cache memory for a typical 486 system running at 20 megahertz.

Figure 3:
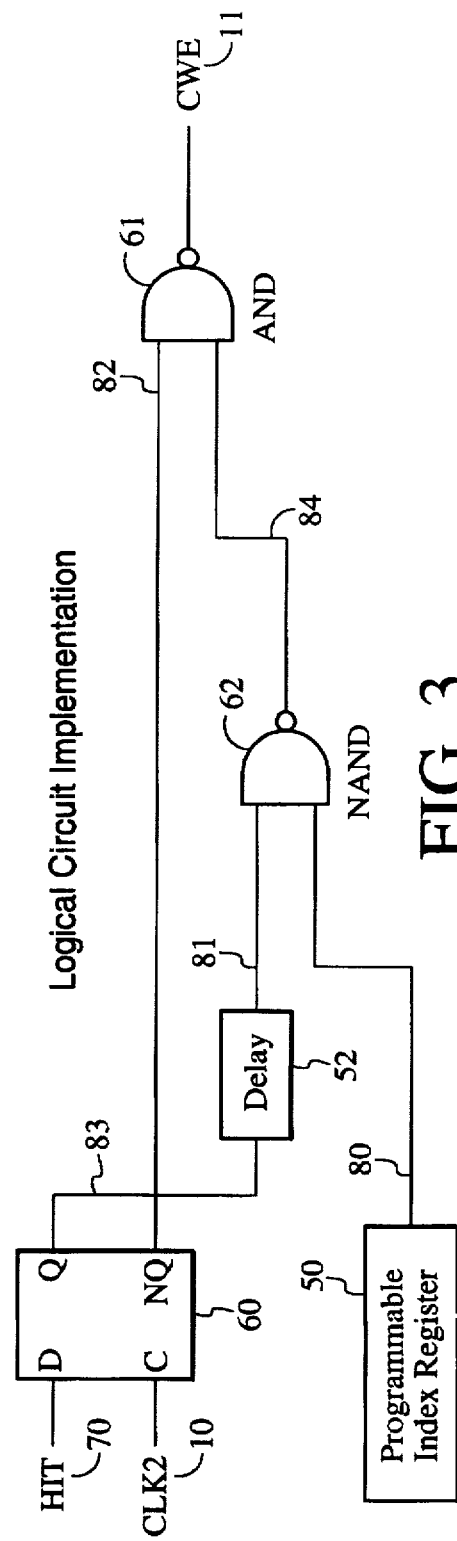
FIG. 3 shows the logical circuit implementation of the preferred embodiment.

Referring to FIG. 3, there is illustrated a logical implementation of the preferred embodiment. The logic implementation comprises a data type flip flop with one output [Q] coupled to delay element 52 via line 83 and a complement output NQ coupled to a first input of And gate 61 via line 82. Programmable index register 50 operated on by system software (not shown) is coupled to a first input of Nand gate 62 via line 80.

The output of delay element 52 is coupled to a second input of Nand gate 62 via line 81. The output of Nand gate 62 is coupled to a second input of And gate 61 via line 84. The output of And gate 61 combines the terms that contribute to the generation of, the CWE signal 11. A HIT signal 70 is provided on data input (D) of the flip flop 60.

A clock signal (CLK2, 10) is provided to the clock input (C) of the flip flop. As has been before initialized, the clock frequency of the cache controller is typically twice the clock frequency of the microprocessor; hence, the CLK2 signal.

Signal HIT 70 indicates when a cache memory write is to take place and is a function of the decode of the cycle address, cycle type, and some qualifying timing (not shown). Flip-flop 60 serves to time the CWE 11 pulse to CLK2 10 edges. Delay element 52 is used to determine the amount of delay introduced into the trailing edge of CWE and can be implemented in a simple form as a string of inverters. Programmable register 50 is used in conjunction with system software and nand gate 62 to enable or disable the delay of the trailing edge of CWE 11. And gate 61 is used to combine the terms contributing to CWE 11 generation.

The operation of the circuit for a high speed 386 microprocessor system will first be described. The signal HIT 70 first goes high indicating that a write to the cache memory is in order. This corresponds to edge 30 in FIG. 1. On the next rising edge 20 of CLK2 10, signal 82 will go low and signal 83 will go high. The low on signal 82 causes CWE 11 to immediately go low through And gate 61. This corresponds to edge 22 in FIG. 1. Because signal 80 is high (high speed 386 system) a low appears on signal 84 after the delay of signal 83 through DELAY 52 are nand gate 62.

This low, however, does not affect the leading edge timing of CWE 11. After one CLK2 10 period signal HIT 70 goes low, signal 83 then goes low and signal 82 goes high after the next CLK2 10 rising clock edge (edge 21 in FIG. 2). The CWE still remains low however until the signal 83 information propagates to signal 84 through DELAY 52 and nand gate 42 causing it to go to a high.

This, in turn, delays the trailing edge of CWE 11, widening the low pulse width time. This trailing edge corresponds to edge 24 in FIG. 2. The wider CWE 11 pulse width enables a high speed PC system (40 megahertz) to use common (20 ns) SRAM memory for the data cache. It is possible to delay the trailing edge of the CWE 11 signal and still achieve the data hold time for the SRAMs because the 386 holds data to edge 25 in FIG. 1. If we were to use the wider CWE 12 pulse width with a 486, the data hold time to the SRAMs would be insufficient because the 486 holds data only to edge 14 in FIG. 2.

The low speed 486 microprocessor mode of operation is accommodated by programming the Index register 80 through software such that signal 80 is low. The signal 84 is now always a high to that it offers no contribution to the CWE 11 pulse. This causes the pulse width to be smaller, thereby causing the trailing edge 27 of CWE 11 to occur sooner. Because the CWE trailing edge now occurs before the hold time of the data expires (edge 24), the data can be correctly updated in the cache data SRAMs.

A typical approach in to utilize the system software disclosed in co-pending U.S. patent application No. 07/544, 821, entitled, "Data Cache Management System with Test Mode Using Index Registers and CAS Disable Posted Write Disable," assigned to the Assignee of the present invention. This patent application is incorporated by reference. The software in the above-identified patent application can program the register such that the CAS signals can be inhibited or enabled. In a similar manner, the cache controller can be modified to handle both a 386 or 486 microprocessor.

By providing a cache controller that is able to delay or not delay the trailing edge of CWE, the controller is able to provide a needed wider CWE pulse width for high speed 386 systems. The controller is, in addition, able to provide a narrower CWE pulse that will accommodate the stricter data hold time of the 486. These features together enable a single cache controller to support both high speed 386 and slower 486 systems, availing to PC manufactures the ability to quickly convert an existing 33 megahertz 386 design to either a 40 megahertz 386 system or a 20 megahertz 486 system.

This present invention allows the system software, such as the BIOS, to select the delay of the trailing edge of the cache write enable signal (CWE) generated by a cache controller. The software can program the cache controller to delay the trailing edge of CWE and increase the pulse width to allow 40 megahertz 386 systems to use common (20 ns) cache data SRAMs. Alternately, the software can program the cache controller to not add the delay, thereby meeting the data hold time requirement of the data SRAMs in a 20 megahertz 486 system.

This dual functionality enables manufacturers to quickly convert an existing 33 megahertz 386 system to a 40 megahertz 386 system or a 20 megahertz 486 system. This enables the PC manufacturer, using a single system controller, to introduce a multitude of computer system solutions into the marketplace in a timely fashion with minimum effort. One of ordinary skill in the art recognizes that although software is utilized to modify the WE signal in the present invention, it is well known that there are other ways to implement this feature.

Hence, numerous and various other arrangements can be readily devised in accordance with these principles by one of ordinary skill in the art without departing from the spirit and scope of the present invention and is limited only by the following claims.

I claim:

1. In a cache controller for use in a microprocessor-based system, the system including a static random access memory (SRAM), the cache controller for providing a write enable (WE) signal to the SRAM, a circuit for modifying a WE signal pulse width in order to accommodate a plurality of microprocessor types, the circuit comprising:

signal hit means responsive to a signal hit for providing a signal indicating a cache write is to take place, the WE signal going to an active low state in response to the signal hit going high;

delay means coupled to the signal hit means being responsive to the signal from the signal hit means for providing a delay to the WE signal, the delay shifting a trailing edge of the WE signal for extending the WE signal pulse width by a predetermined time period;

programmable means coupled to the delay means for enabling and disabling the delay, wherein the delay enabled by the programmable means does not affect a leading edge of the WE signal, wherein the delay is disabled if one of the plurality of microprocessor types providing a first data hold time is operating in the system, and wherein the delay is enabled if another one of the plurality of microprocessor types providing a second data hold time longer than the first data hold time is operating in the system; and a gate coupled to the programmable means and the delay means, the gate having an output producing a logic high when the delay is disabled, wherein the WE signal goes to an inactive high state without the delay in response to the signal hit going low.

2. The circuit according to claim 1 wherein the delay means comprises a plurality of inverters.

3. The circuit according to claim 1 wherein the programmable means comprises a programmable index register means.

4. The circuit according to claim 1 wherein the other one of the plurality of microprocessor types providing the second data hold time comprises a 386 microprocessor.

5. The circuit according to claim 1 wherein the one of the plurality of microprocessor types providing the first data hold time comprises a 486 microprocessor.

6. In a cache controller for use in a microprocessor-based system, the system including a static random access memory (SRAM), and a clock, the cache controller for providing to the SRAM a write enable (WE) signal having a leading edge and a trailing edge, a circuit for modifying a WE signal pulse width in order to accommodate a plurality of microprocessor types, the circuit comprising:

signal hit means for providing a signal indicating when a WE is to take place;

flip-flop means coupled to the signal hit means responsive to the signal for producing a first logic signal and a second logic signal, the WE signal going to an active low state in response to the second logic signal going low;

delay means coupled to the flip-flop means responsive to the first logic signal from the flip-flop means for providing a delay to the trailing edge of the WE signal, the delay shifting the trailing edge of the WE signal for extending the WE signal pulse width by a predetermined time period;

programmable means coupled to the delay means for enabling and disabling the delay, wherein the delay enabled by the programmable means does not affect the leading edge of the WE signal, wherein the delay is disabled if one of the plurality of microprocessor types providing a first data hold time is operating in the system, and wherein the delay is enabled if another one of the plurality of microprocessor types providing a second data hold time longer than the first data hold time is operating in the system; and a gate coupled to the programmable means and the delay means, the gate having an output producing a logic high when the delay is disabled, wherein the WE signal goes to an inactive high state without the delay in response to the second logic signal going high.

7. The circuit according to claim 6 wherein the delay means comprises a plurality of inverters.

8. The circuit according to claim 6 wherein the programmable means comprises a programmable index register means.

9. The circuit according to claim 6 wherein the other one of the plurality of microprocessor types providing the second data hold time comprises a 386 microprocessor.

10. The circuit according to claim 6 wherein the one of the plurality of microprocessor types providing the first data hold time comprises a 486 microprocessor.

* * * * *